United States Patent
Hirsch et al.

(10) Patent No.: US 8,766,549 B2
(45) Date of Patent: Jul. 1, 2014

(54) HID LIGHTING SYSTEM

(75) Inventors: John Stephane Hirsch, Eindhoven (NL); Rene Van Honschooten, Eindhoven (NL); Patrick Alouisius Martina De Bruycker, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 119 days.

(21) Appl. No.: 13/579,321

(22) PCT Filed: Jan. 30, 2011

(86) PCT No.: PCT/IB2011/050402
§ 371 (c)(1),
(2), (4) Date: Aug. 16, 2012

(87) PCT Pub. No.: WO2011/104644
PCT Pub. Date: Sep. 1, 2011

(65) Prior Publication Data
US 2012/0306395 A1 Dec. 6, 2012

(30) Foreign Application Priority Data

Feb. 24, 2010 (EP) .................................. 10154506
Jun. 7, 2010 (EP) .................................. 10165069
Nov. 5, 2010 (EP) .................................. 10190114

(51) Int. Cl.
*H05B 41/36* (2006.01)
(52) U.S. Cl.
USPC ...................... 315/200 R; 315/224
(58) Field of Classification Search
None
See application file for complete search history.

(56) References Cited

U.S. PATENT DOCUMENTS

| | | | | |
|---|---|---|---|---|
| 4,329,627 A | * | 5/1982 | Holmes ..................... | 315/209 R |
| 4,373,146 A | * | 2/1983 | Bonazoli et al. .......... | 315/209 R |
| 4,572,988 A | * | 2/1986 | Handler et al. ........... | 315/209 R |
| 4,983,889 A | | 1/1991 | Roberts | |
| 5,121,034 A | | 6/1992 | Allen | |

(Continued)

FOREIGN PATENT DOCUMENTS

| EP | 1298707 A2 | 4/2003 |
|---|---|---|
| WO | 9845872 A1 | 10/1998 |

(Continued)

OTHER PUBLICATIONS

Cheng, C-A et al "Design and Implementation of Frequency-Modulated Electronic Ballast for Metal-Halide Lamps", IEEE Proceedings: Electric Power Application, Institution of Electrical Engineers, vol. 153, No. 5, Sep. 1, 2006, pp. 702-710.

(Continued)

*Primary Examiner* — Crystal L Hammond (57) ABSTRACT

A low-cost HID lighting system (100) comprises: —an HID lamp (1) having an aspect ratio less than 6; and —a resonant electronic driver (10) for driving the HID lamp, the driver being designed for providing alternating current to the lamp and including a control device (30) for determining the current frequency. The lamp has a frequency spectrum containing at least one arc-shaping acoustic resonance frequency as well as unwanted acoustic resonance frequencies. During normal operation, the lamp is provided with frequency-modulated lamp current so that the lamp current has a relatively broad power spectrum within a range between kHz and 200 kHz, so that said arc-shaping acoustic resonance is triggered while said unwanted acoustic resonances are avoided, irrespective of lamp orientation.

14 Claims, 6 Drawing Sheets

(56) References Cited

U.S. PATENT DOCUMENTS

| | | | | |
|---|---|---|---|---|
| 5,434,479 | A | * | 7/1995 | Ohnishi et al. ............. 315/209 R |
| 5,677,602 | A | * | 10/1997 | Paul et al. ...................... 315/224 |
| 5,880,561 | A | * | 3/1999 | Miyazaki et al. ......... 315/209 R |
| 5,917,290 | A | * | 6/1999 | Shen et al. ................ 315/209 R |
| 6,181,076 | B1 | * | 1/2001 | Trestman et al. ............. 315/224 |
| 6,680,582 | B1 | * | 1/2004 | Cammack ...................... 315/224 |
| 7,432,665 | B2 | * | 10/2008 | Geijtenbeek et al. ......... 315/291 |
| 7,688,000 | B2 | * | 3/2010 | Hendrix ........................ 315/224 |
| 2003/0117086 | A1 | | 6/2003 | Kramer |
| 2006/0125415 | A1 | * | 6/2006 | Geijtenbeek et al. ......... 315/291 |
| 2006/0158133 | A1 | * | 7/2006 | Vermeulen et al. ....... 315/209 R |
| 2006/0273723 | A1 | | 12/2006 | Stockwald |
| 2007/0114943 | A1 | * | 5/2007 | Hendrix ........................... 315/59 |
| 2009/0267529 | A1 | | 10/2009 | Muhlschlegel |
| 2010/0060183 | A1 | | 3/2010 | Tamai |

FOREIGN PATENT DOCUMENTS

| | | |
|---|---|---|
| WO | 9953522 A1 | 10/1999 |
| WO | 2005088675 A1 | 9/2005 |
| WO | 2006044091 A1 | 4/2006 |
| WO | 2008068666 A2 | 6/2008 |

OTHER PUBLICATIONS

Hirsch, John et al "Acoustric Resonances in HID Lamps: Model and Measurement" Journal of Physics D: Applied Physics, vol. 43 (234002), 2010, pp. 1-7.

* cited by examiner

HID LIGHTING SYSTEM

FIELD OF THE INVENTION

The present invention relates in general to the field of discharge lamps, particularly HID lamps, i.e. High Intensity Discharge Lamps, also indicated as high pressure discharge lamps. More in particular the invention relates to the field of HID lamps comprising a ceramic discharge vessel, that is a discharge vessel having a ceramic wall.

BACKGROUND OF THE INVENTION

HID lamps as such are commonly known, so a description is kept brief here. Suffice it to say that such lamp comprises in most cases an elongate discharge vessel enclosing a discharge space with two electrodes and an ionizable gas filling. Alternatively the discharge vessel can be spherical shaped. During operation, a high voltage causes a discharge, resulting in a conductive plasma allowing a lamp current. As long as the current flows, the plasma is maintained. The amount of light generated depends on the current magnitude, and also the color may vary with current. Although it is possible to use direct current, it is common to use commutating direct current, i.e. the current magnitude remains constant but the direction is changed at a commutation frequency.

A particular group of HID lamps having widespread application in the fields of both public and domestic lighting comprise a ceramic discharge vessel. In this description and claims this means that the wall of the ceramic discharge vessel comprises a translucent crystalline metal oxide, like monocrystalline sapphire and densely sintered polycrystalline alumina (also known as PCA), YAG (yttrium aluminum garnet) and YOX (yttrium aluminium oxide), or translucent metal nitrides like AlN. The vessel wall may consist of one or more (sintered) parts, as known in the art.

HID lamps are favorable with a view to light output and energy consumption. However, an HID lamp cannot be powered directly from mains or any other voltage source, but requires an electronic driver. An HID system comprises the combination of the actual lamp and its electronic driver. An objective of the present invention is to provide a low-cost HID system. The cost price of the driver forms a major part of the cost price of the HID system. Thus, there is a demand for reducing the size and costs of the electronic driver.

SUMMARY OF THE INVENTION

When designing an electronic driver, the operational commutation frequency plays an important role in the costs of the driver. Thus, with a view to costs, the frequency range between 10 kHz and 200 kHz is the most interesting range. This is the operational range of fluorescent lamps, so it is cost-efficient if, basically, the same driver design can be used. A driver design commonly used for fluorescent lamps is a resonant design, producing alternating current with a substantially sine-shaped waveform. Resonant drivers have an inherent advantage of both providing an increased ignition voltage as well as steady state current during normal operation.

However, a problem is that in this frequency range lamp acoustic resonances may occur in HID lamps. Persons skilled in this art will recognize that acoustic resonances may lead to instabilities.

It is an objective of the present invention to design an HID system in such a way that a low cost driver operating in said frequency range can be used while avoiding, at least to a sufficiently large extent, lamp instabilities caused by acoustic resonances.

To meet this objective, one could try to find a so-called "safe" frequency within said range, where no acoustic resonance occurs. Typically, the acoustic behavior of a specific HID lamp can be expressed as an acoustic spectrum having acoustic spectral lines where an acoustic resonance occurs, each spectral line having a height and a width, and in between these lines there are safe regions or resonance-free regions. As such, it could be possible to determine the spectrum and thus determine the safe regions.

When designing a lamp driver for said range, there are roughly three types of problems to overcome:
variations in the spectrum;
required accuracy;
electrode design.

The frequency spectrum of an HID lamp, i.e. the exact location and shape of the acoustic spectral lines, depends, among other things, on the precise shape and size of the lamp, its filling components, etc. In general, lamp manufacture itself introduces tolerances in the lamp dimensions, which tolerances translate to variations in the acoustic spectrum and hence a narrowing of the safe regions. This problem is worsened by the fact that the frequency spectrum of an HID lamp is not constant but depends on orientation: horizontally or vertically, or at an intermediate angle. The acoustic spectral lines shift with varying positional angle. While, in any given orientation of any given lamp, the safe regions may be relatively wide, a problem is that the operational orientation is not known in advance and the lamp system should be capable of working properly in any orientation, so the designer of a driver should look for a region that is resonance free in any and all lamp orientations, taking account of the lamp tolerances. While it usually will be possible to find such all-orientations safe regions, they are typically quite narrow, and using them would require a very accurate and stable driver. This would make the driver expensive.

Further, operating HID lamps at high frequency results in a higher electrode temperature. Because of the high electrode temperature, the electrodes will melt faster, resulting in a higher tungsten release in the burner and hence wall blackening and hence a relative low maintenance.

The present invention aims to provide a solution to any of the above problems, preferably in combination.

One aspect of the invention relates to the selection of lamp type. A low-cost HID system according to the present invention comprises a ceramic metal halide lamp (also indicated as CDM lamp) having an aspect ratio smaller than 6, preferably smaller than 5. In such lamp, the discharge vessel is made of a ceramic material, in contrast to lamps where the vessel is made of quartz or quartz glass. The manufacturing process of such ceramic discharge vessels can be performed with a high grade of accuracy, higher than is possible for quartz vessels. Here, the aspect ratio is defined as EA/di, with EA indicating the mutual electrode distance in the vessel and di indicating the largest internal cross-sectional diameter of the vessel, as measured at all positions over the electrode distance.

In view of the high manufacturing accuracy, the design of a lamp driver does not need to take account of variations in the lamp acoustic spectrum.

Preferably, the lamp has an aspect ratio smaller than about 3, and more preferably the aspect ratio is between about 1 and about 3. In this range of aspect ratios, many types of HID lamps are available on the market having light technical properties of very high standard.

According to a second aspect of the present invention, the acoustic spectrum is made substantially orientation-independent. This aspect of the present invention is based on the insight that an orientation-dependency of the acoustic resonance frequencies is mainly caused by a changing shape of the discharge channel. If left to itself, the discharge channel of a vertically operated lamp is straight while the discharge channel of a horizontally operated lamp is bent. Although the phrase "arc" originates from the bent shape of a horizontal discharge, this phrase will in the following be used to simply indicate the discharge channel whatever its shape.

Based on this insight, the HID system according to the present invention comprises arc-shaping means, fixing the arc's shape to an orientation-independent shape. As a result, the acoustic spectrum of the lamp is substantially orientation-independent. Hence, the restraints for the driver designer are reduced: it becomes possible to select a relatively wide resonance-free frequency region and to design a driver such as to operate in this region without high accuracy of the driver being needed.

One possible way for implementing arc-shaping means is to provide external means capable of exerting a positioning force on the arc. Such external means may for instance comprise a magnetic field.

In the above, it has been mentioned that some operational frequencies may lead to acoustic resonance. This means that the lamp has certain acoustic resonance frequencies, and these frequencies are a lamp characteristic; it is noted that these are related to the power frequency, which in the case of alternating current is twice as high as the current frequency. In a similar manner, there are certain characteristic frequencies that cause the arc to assume a certain fixed shape. For instance, the lamp may have one or more characteristic frequencies where the arc shape is a straight line; the lamp may have one or more characteristic frequencies where the arc shape is a single curve; the lamp may have one or more characteristic frequencies where the arc shape is a double curve or S shape; etc. Such frequencies will in general be indicates as arc-shaping frequencies. If the specific shape is indicated, the arc-shaping frequencies will be indicated as straightening frequency, bending frequency of first order, bending frequency of second order, etc. Thus, another possible way for implementing arc-shaping means is to have the driver operate at a certain arc-shaping frequency, an arc-straightening frequency being preferred. It is noted that an arc-straightening frequency is usually located between the frequency associated with the first azymuthal mode and the frequency associated with the first radial mode.

In principle, it is possible to operate the lamp at one single fixed operational frequency. This is particularly useful if the lamp is to be operated in a resonance-free frequency region. However, if the lamp is to be operated at an arc-shaping frequency, the driver would have to be designed with a relatively high degree of accuracy. On the other hand, if, for whatever reason, the operational frequency is close to an undesirable acoustic resonance frequency, it may be that the high power provided at the single operational frequency might trigger an undesirable acoustic resonance.

To overcome this problem, the power spectrum of the lamp current is preferably widened and lowered. A relatively simple and preferred manner of achieving this is to add modulation to the operational frequency, for instance in the form of a frequency sweep. In an example, a lamp may have an arc-straightening resonance frequency at about 110 kHz in an otherwise resonance-free region between 60 kHz and 150 kHz. When the driver is designed to sweep the power frequency between, for instance, 90 kHz and 130 kHz, the power amplitude at any frequency within the range is substantially lower as compared to the power amplitude at the single power frequency in the case of a constant commutation frequency, so that there is insufficient energy to trigger an undesirable resonance mode that might accidentally be covered if lamp tolerance and driver tolerance make an undesirable acoustic resonance frequency coincide with the current power spectrum, while at the same time sufficient power is placed at the arc-straightening frequency such as to achieve arc-straightening. Although it is preferred that the power spectrum of the current avoids the lamp's unwanted acoustic resonance frequencies, it is acceptable if the power amplitude coinciding with such unwanted acoustic resonance frequency is so low that it does not cause the resonance to occur: this will be indicated as non-enabling power amplitude, in contrast to enabling power amplitude which is sufficiently high such as to cause the corresponding resonance.

It is noted that the sweep frequency is not critical, but should be sufficiently high. By way of example, the sweep frequency may be around 10 kHz.

Depending on the selected modulation scheme (i.e. amplitude modulation, frequency modulation, phase modulation, frequency shift keying), and on the modulation depth or modulation range (e.g. sweep range), it is easily possible to reduce the peak power in the current power spectrum by a factor 10 or more.

With the features as explained above, it is possible to provide a low-cost and stable HID system. In an advantageous lighting system according to the invention the lamp is a metal halide lamp, comprising a ceramic discharge vessel wherein the discharge space contains an inert gas and a salt. Preferably the salt comprises Na halide, Tl halide and a halide of one or more of the elements Dy, Ho and Tm. More preferably the salt comprises iodides of Na, Tl and an iodide of at least one of the elements Dy, Ho and Tm. Thus a lighting system according to the invention is achieved provided with a lamp of well accepted general high quality with respect to both luminous efficacy and color rendering.

According to a third aspect of the present invention, it is possible to further improve this system with a view to luminous efficacy over time, also indicated as efficacy maintenance. With the use of an operational commutation frequency in the relatively high range between 10 kHz and 200 kHz, an increased electrode temperature results, causing the electrodes to melt faster, which in turn results in a higher tungsten release in the discharge vessel, an increased blackening of the vessel wall, and hence a reduced maintenance. This aspect can be accepted if the increased costs involved with more frequent replacement are outweighed by the reduced costs of the system as a whole. However, it is also possible to enhance the efficacy maintenance by a specific design of the lamp.

In a first approach, the lamp vessel contains a salt which allows a tungsten cycle. By way of example, such salt may contain sodium, thallium, calcium, cerium, or a mixture of these elements. Experiments show that, after 2000 burning hours, a lamp without a tungsten cycle and operated vertically may have its efficacy reduced to 65% while the reduction of a comparable lamp with tungsten cycle is only to 85%. Likewise, experiments show that, after 2000 burning hours, a lamp without a tungsten cycle and operated horizontally may have its efficacy reduced to 88% while the reduction of a comparable lamp with tungsten cycle is only to 98%.

In a second approach, the lamp vessel contains an unsaturated filling making available, during operation, a high pressure of rare earth. Experiments show that, after 2000 burning hours, the efficacy reduction for a vertically operated lamp may be to only 90% (as compared to 65%) while for a horizontally operated lamp this reduction may be to only 95% (as compared to 88%).

Lamps that are particularly useful in this respect are for instance disclosed in WO1999/053522-A1, WO2005/088675-A1 and WO2008/068666-A2. Most suitably, the lamp's ionizable filling contains a quantity of halide of Na and Tl in addition to Hg, and also contains Ca. The filling may either exclude or include one or more rare earth metals. The latter is for instance described in WO98/45872.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
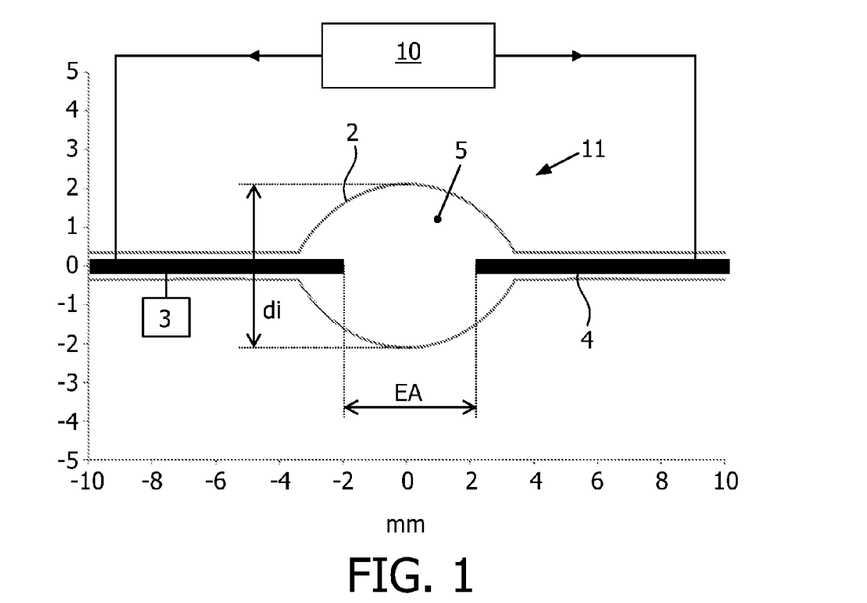
FIG. 1 schematically shows an HID lamp.

FIG. 1 schematically shows an exemplary HID lamp 1, comprising a ceramic vessel 2, also indicated as "burner", filled with an ionizable gas 5. Two electrodes 3, 4 are arranged opposite each other, extending through the vessel wall to the outside for receiving electrical power from a driver 10.

Figure 2A:
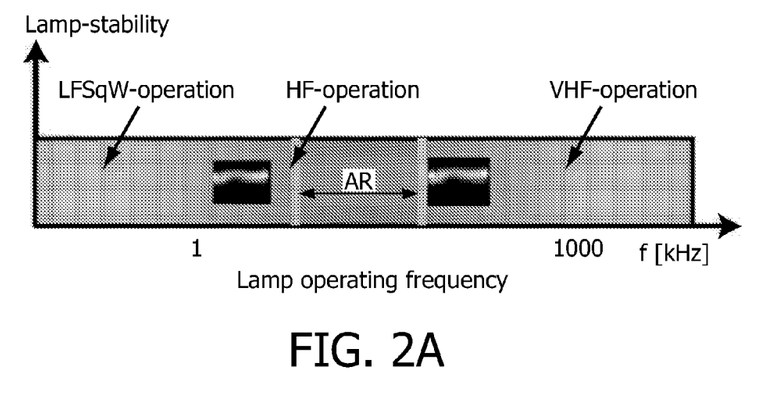
FIG. 2A illustrates a typical stability plot of an HID lamp.

FIG. 2A shows a typical frequency-stability plot for an HID lamp, wherein the horizontal axis is logarithmic. The figure shows that the range from 10 kHz to 200 kHz, which is typically used for fluorescent lamps, coincides with a range where HID lamps show acoustic resonance (AR).

Figure 2B:
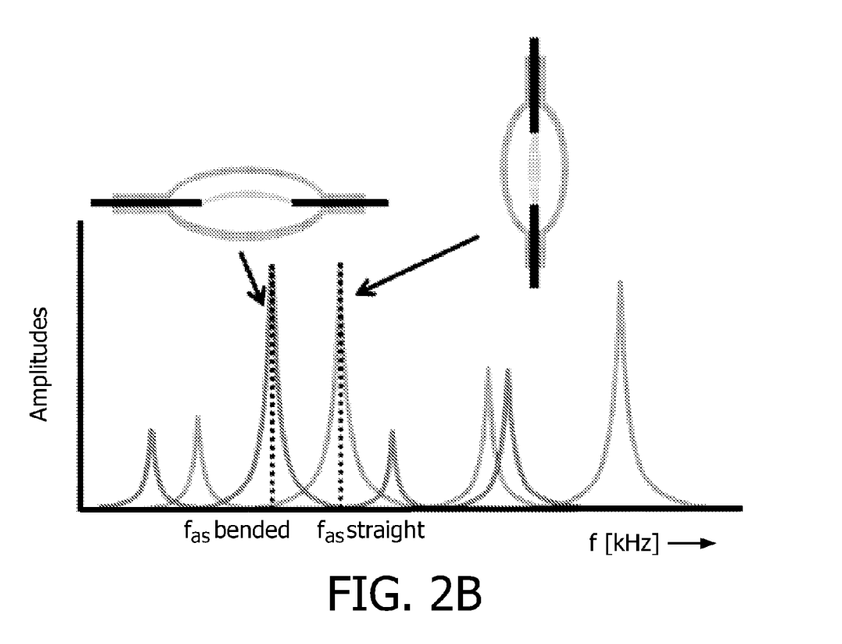
FIG. 2B illustrates orientation-dependency of the acoustic resonance spectrum of an HID lamp.

Each burner geometry has its own specific AR spectrum. An example of such spectrum is given in FIG. 2B. The figure also shows that the AR spectrum depends on lamp orientation, which is mainly caused by the shape of the arc being orientation-dependent. The driver 10 according to the present invention is designed to use arc straightening to realize a burner position independent AR spectrum.

Arc straightening will be realized by putting power components at a specific acoustic resonance; the arc straightening resonance. Below, more detailed information about the AR spectrum and arc straightening is given.

The resonance frequencies of a HID burner can be calculated by solving the homogeneous Helmholtz equation:

$$\vec{\nabla}^2(p(\vec{r})) + \left(\frac{\omega^2}{c^2}\right)p(\vec{r}) = 0$$

wherein:
p=gas pressure
c=sound velocity
ω=angular frequency

For a cylinder of length L and radius R, for example, the resonance frequencies are given by $$f_{lmn}^2 = f_z^2 + f_r^2 = \left(\frac{nc_z}{2L}\right)^2 + \left(\frac{\alpha_{lm}c_r}{2\pi R}\right)^2$$

wherein:
$c_r$=radial sound velocity
$c_z$=longitudinal sound velocity
l, m, n=mode indices: n refers to longitudinal modes, l and m to azimuthal and radial modes
$\alpha_{lm}$ is the m th zero of the first derivative of the Bessel function of order 1 (J1).

Arc straightening is associated with the first radial/azimuthal mode; hence, given the radius of the cylindrical burner and the speed of sound, it is then possible to calculate the frequency of the arc straightening peak. In simple terms for relatively standard geometries, the arc straightening frequency can be approximately calculated using $$F_{As} = A \cdot \frac{c}{D}$$

wherein:
$F_{As}$=arc straightening frequency
A=a constant
c=the speed of sound
D=the burner diameter
c is usually a value between 400 and 500 m/s for mercury-containing lamps. For mercury-free lamps, this value will scale as a function of pressure and viscosity.

A similar calculation can be performed for all other geometries; of course, if the geometry deviates from the "classical" geometry, the homogeneous Helmholtz equation has to be solved numerically.

Additional to these theoretical calculations, the arc straightening of a HID burner can be measured experimentally. One technique consists in using a low frequency square wave with superimposed HF sinusoidal probing signal.

In power spectrum the square wave part of the signal behaves like a DC power. The amplitude of the square wave is kept constant, and the amplitude and frequency of the HF signal can be varied.

The ratio between superimposed HF signal voltage and square wave amplitude is called modulation depth. It is a measure for the amount of probing frequency in the source signal.

Example of an Arc-Straightening Measurement

Figure 3:
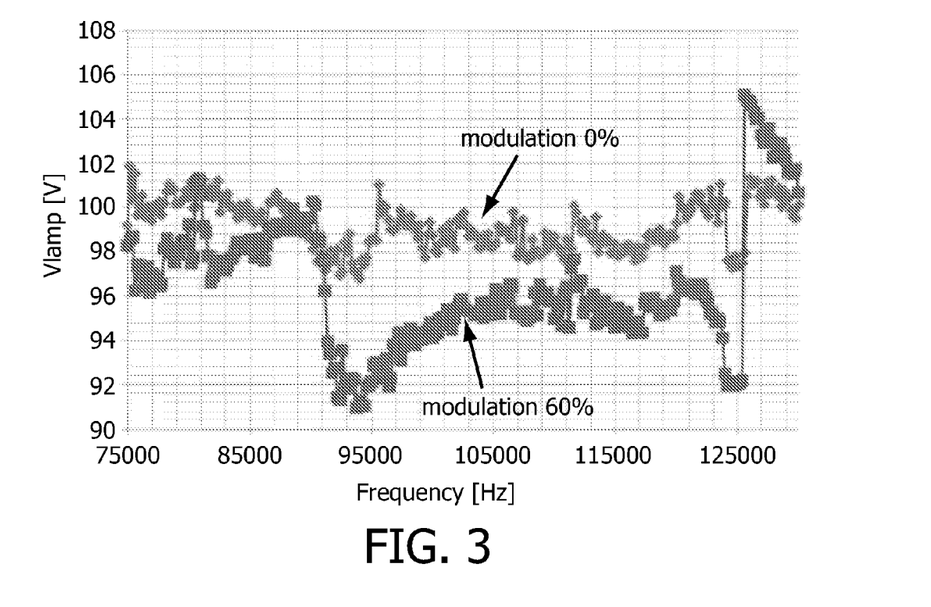
FIG. 3 is a graph showing the results of measuring the arc-straightening resonance.

FIG. 3 shows the results of measuring the arc-straightening resonance.

In horizontal position, arc straightening is detected by a decrease in the lamp voltage, corresponding to the plasma arc moving from a bent position to a straight position with respect to an axis defined by the lamp electrodes.

Hence, independently of the shape of a burner and also its aspect ratio, the arc straightening frequency can be calculated and measured in order to define the lamp driving frequency for stable operation.

Next to the arc straightening frequency, other acoustic resonance frequencies exist. The geometry of the burner will define the frequency of other acoustic resonances which can lead to unstable operation. The electrode distance and pressure will define the amplitude of these acoustic resonances.

This will influence the width of the frequency modulation as well as the shape of the power spectrum.

This technique is applicable for HID lamps containing a starting gas, a salt filling (including but not limited to sodium, thallium, cerium, calcium, scandium, dysprosium . . . ), with mercury, and a starting gas, a salt filling (including but not limited to sodium, thallium, cerium, calcium, scandium, dysprosium . . . ) without mercury.

Example of a Calculation of the AR Spectrum

Figure 4:
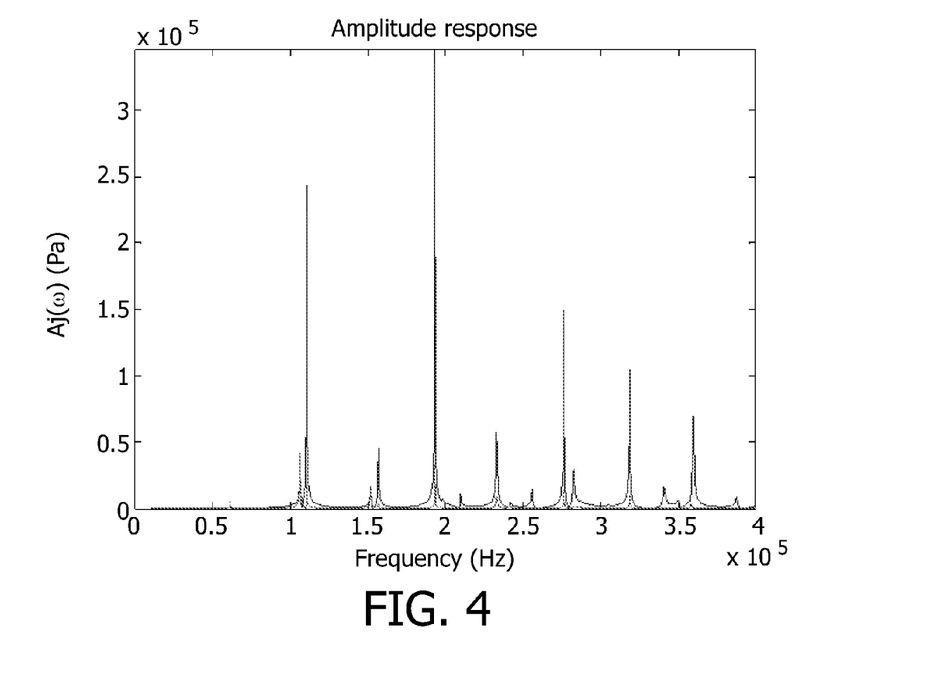
FIG. 4 is a graph showing a calculated frequency spectrum of a lamp vessel.

When the vessel geometry is known, see for instance FIG. 1, it is possible to solve the Helmholtz equations in order to calculate the frequency of the arc straightening resonance (solution of the homogenous equation) but also its relative amplitude (solution of the inhomogeneous equation including a source term or excitation term). FIG. 4 is a graph showing a calculated AR spectrum using a 2D rotational symmetric model assuming a straight plasma arc.

By comparing these calculations with measurements, we conclude that the arc straightening resonance is at a frequency of ~110 kHz.

Hence we expect a stable operation in this frequency 110 kHz region; adding a frequency sweep ensures that even with the tolerances on the burner geometry we still excite the arc straightening resonances.

Figure 5:
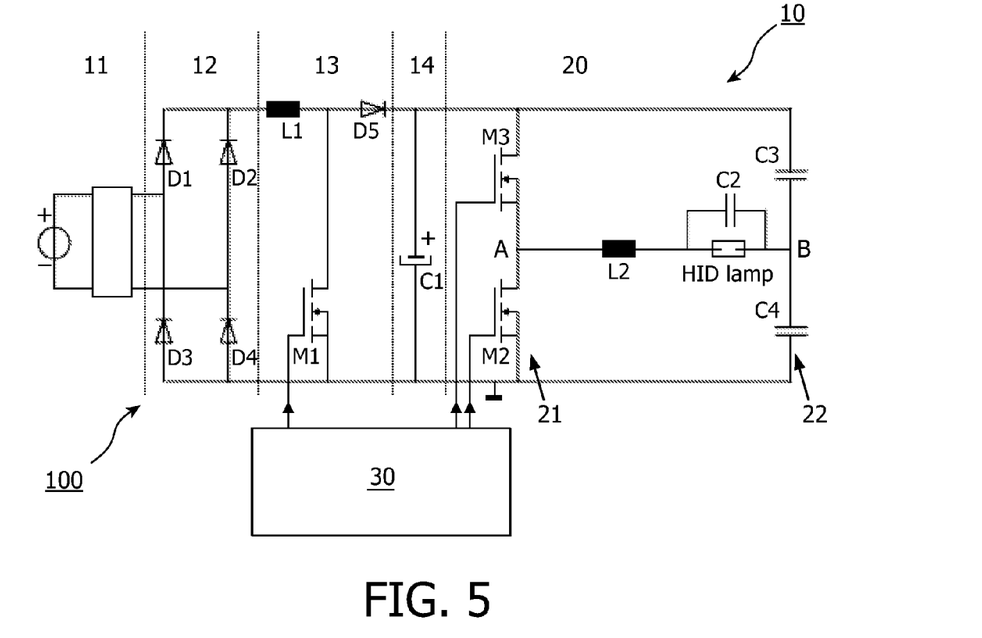
FIG. 5 is a block diagram of an electronic lamp driver.

For designing the driver 10, the standard design of a resonant circuit such as used for driving fluorescent lamps can be used as a starting point. FIG. 5 is a block diagram of an HID lighting system 100, schematically illustrating this standard design, which has a half-bridge topology, but it is noted that a resonant design can obtained with a topology differing from a half-bridge topology; for instance, a full-bridge topology may be used. Since this design of FIG. 5 is known, an explanation thereof will be kept brief. Assuming that the driver 10 is to be powered from mains 11, the driver 10 comprises a rectifier stage 12, an optional power factor correction stage 13, a voltage buffer or voltage source 14, and a resonant half-bridge circuit 20. Depending on the precise implementation, the voltage at the input of the bridge circuit 20 is more or less stable, although it may carry a ripple caused by mains and/or caused by the switching in the power factor correction stage 13. The half-bridge circuit 20 comprises a parallel arrangement of two branches 21 and 22 connected between the voltage input rails. A first branch 21 comprises a series arrangement of two switches M2 and M3 with an intermediate node A. A second branch 22 comprises a series arrangement of two capacitors C3 and C4 with an intermediate node B. The HID lamp is connected between said two nodes A and B, with an inductor L2 arranged in series with the lamp and a capacitor C2 arranged parallel to the lamp.

The circuit 10 comprises a control device 30, controlling the two switches M2 and M3 as well as the PFC stage 13. The control device 30 is capable of operating in an ignition mode for igniting the lamp when the lamp is off: in that case, the impedance in the path between nodes A and B is determined by the resonant circuit of L2 and C2. The control device 30 starts operating the two switches M2 and M3 at a relatively high frequency and then reduces this frequency: when the resonance frequency of the resonant circuit of L2 and C2 is reached, a high voltage will develop over C2 and the lamp ignites. When the lamp is on, the control device 30 quickly switches to steady mode operating at a lower frequency, wherein the lamp current is stabilized by L2.

In the steady mode, the control device 30 is capable of controlling the switching of the two switches M2 and M3 in such a way that the discharge is straightened and undesired AR-related instabilities are smoothened out. Frequency modulation, the earlier described enabler of arc-straightening and stable operation, is implemented in the form of FM.

Varying the half-bridge frequency can be done with several waveforms. Suitable examples are, for instance, a triangular waveform, a sawtooth waveform, a sine waveform. The waveform will eventually determine the shape of the power spectrum, i.e. the power spectrum amplitudes delivered to the discharge. Besides the FM-algorithm, also other components will influence the power (amplitude) spectrum, such as an AM-ripple (e.g. caused by the non-ideal rectified mains), and the frequency characteristic of the resonant lamp driver components (L and C).

Figure 6:
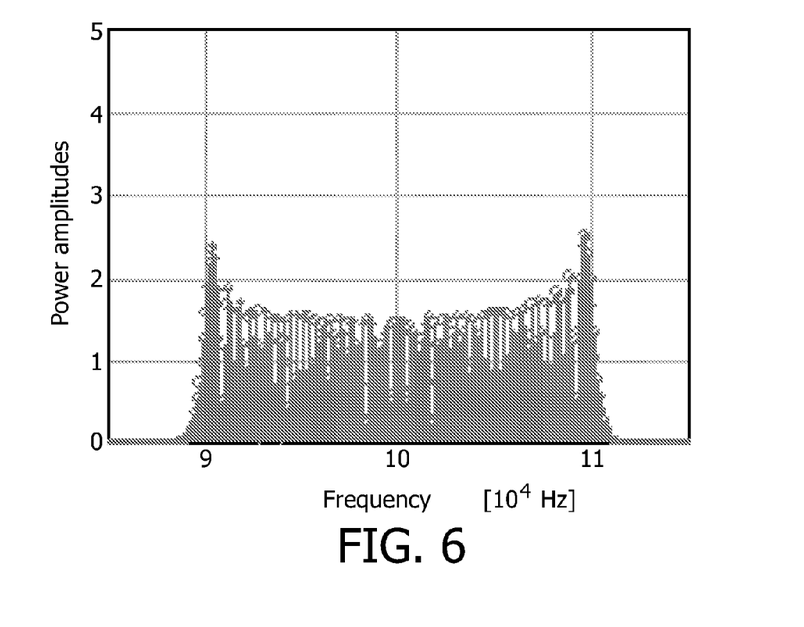
FIG. 6 is a graph showing a power spectrum.

FIG. 6 is a graph showing the resulting power spectrum in the case of frequency modulation based on a sine wave. The figure clearly shows that the power amplitudes in the HF-region are lowered (which enhances the discharge stability; undesired AR are smoothed-out), and that the spectrum is broadened (which is the enabler for triggering the arc-straightening peak).

The spectrum will be broadened and lowered when the FM amplitude is increased. The following typical FM-parameters are in the exemplary design:

Modulation amplitude=10 kHz (Power frequency)
Modulation frequency=100 Hz
Modulation shape=Derived from circuit mains-ripple Although the FM-parameters as mentioned have been extensively tested, the solution proposed by the present invention will also work with other FM parameters. The resulting, FM-determined, powerspectrum will have the following consequences for the invention:

The broad spectrum will help to trigger the arc straightening resonance (resulting in an orientation-independent discharge)

The broad spectrum will help to suppress undesired AR (and thus to enhance stability).

Figure 7A:
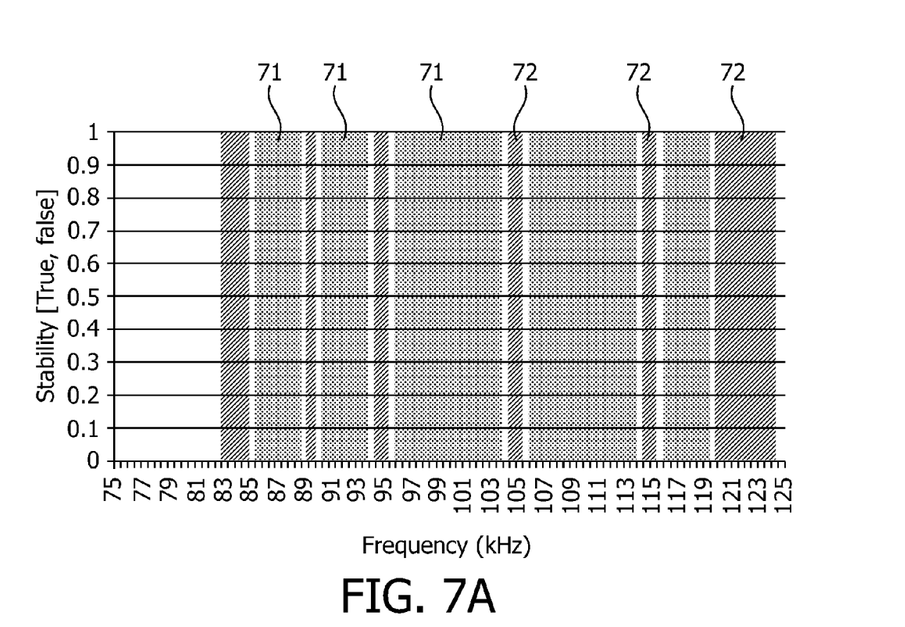
FIGS. 7A-C are stability plots comparable to FIG. 2A.
Figure 7B:
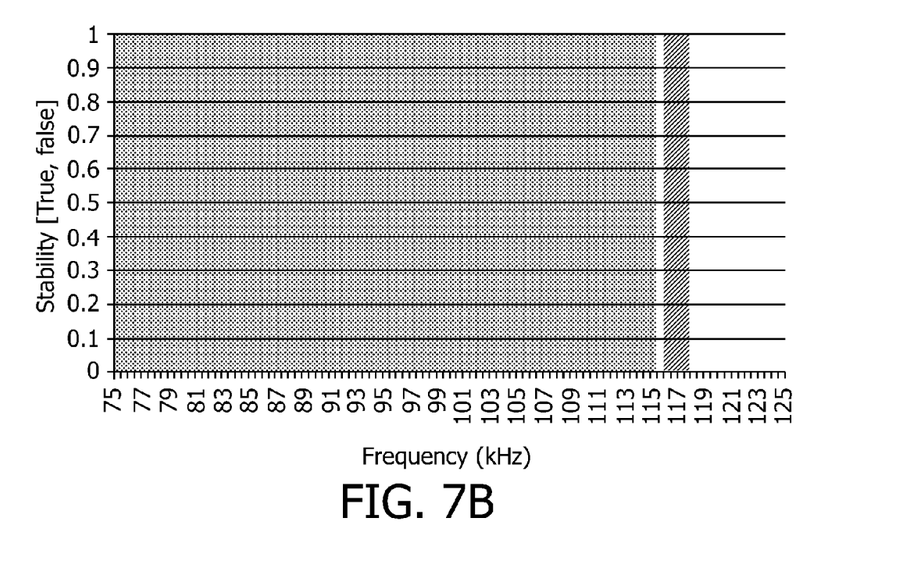
Figure 7C:
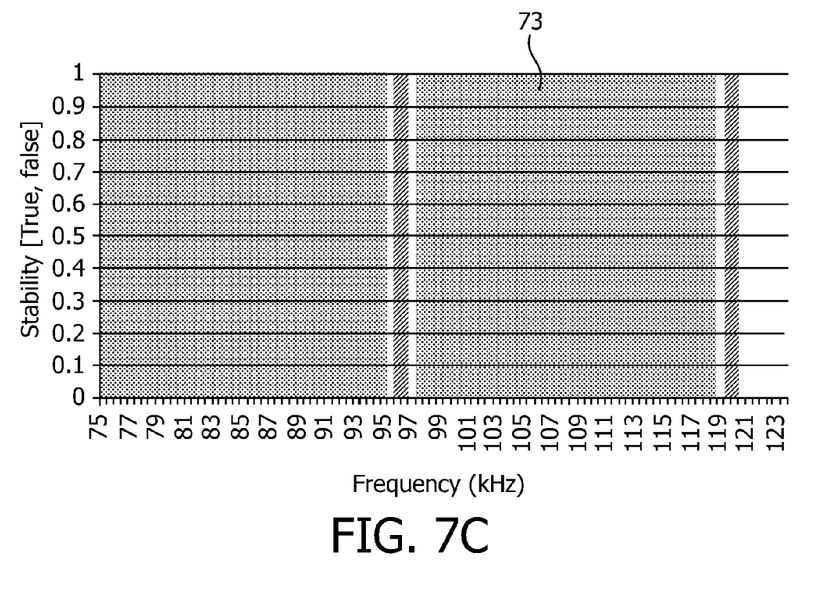

As described earlier, an orientation-independent discharge will be realized when the arc is straightened, or in fact when any arc shape is stabilized so that the arc shape is independent of lamp orientation. Straightening the arc is realized by placing power amplitudes on the earlier mentioned arc-straightening frequency. Hitting this peak can be realized in several ways:

making sure that at least one of the frequencies in the broad power-spectrum (as resulting from the modulation) is targeting the arc-straightening resonance applying a single frequency sweep during start up to target the AS-resonance FIGS. 7A-C are stability plots comparable to FIG. 2A yet on a different scale, illustrating experimentally obtained results. In FIG. 7A, the stability plot is shown of a specific lamp operated in a vertical orientation, with a straight discharge, without modulation. The figure shows that, in the region between 85 kHz and 125 kHz, there are numerous bands 72 where the lamp is not stable, indicated with dark shading, alternating with relatively small regions 71 where the lamp is stable, indicated with light shading. FIG. 7B shows the stability plot of the same lamp, operated in the same orientation but WITH FM modulation. FIG. 7C shows the stability plot of the same lamp WITH FM modulation, but operated in the horizontal orientation with a straight discharge. These figures clearly show that the use of FM modulation creates a large stable operating frequency range between 73 and 120 kHz power. The width of this range is determined by the worse case operation orientation, i.e. horizontal operation. Voltage measurements have been performed, and the results (not shown here) prove that arc-straightening is realized within the measured stable frequency range.

Figure 8:
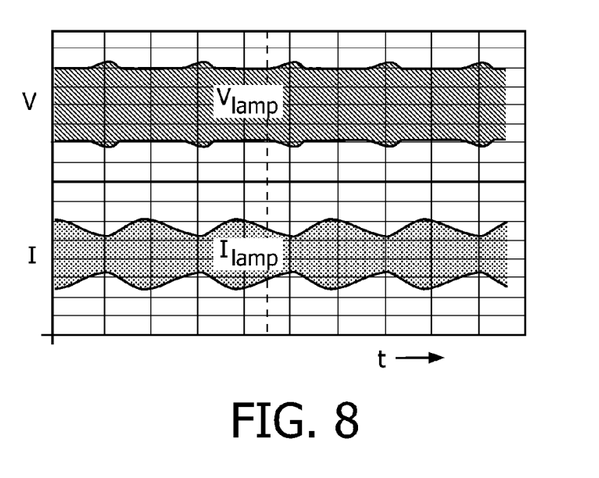
FIG. 8 is a graph showing voltage and current of an HID lamp powered by rectified mains.

In case a driver is powered by rectified mains, the voltage ripple results in a large impedance response of the HID-lamp. This is illustrated in FIG. 8, which is a graph showing voltage and current of an HID lamp powered by rectified mains. It can be seen that the lamp-impedance increases when the mains-ripple is low. This increased lamp-impedance might be followed by lamp extinguishing. This undesired effect can be avoided by a specific modulation algorithm. Thus, it is preferred that the FM-modulation is implemented in synchronization with the mains ripple (100 Hz), i.e. there is a clear relation between the phase of the modulation and the phase of the lamp-impedance, specifically in such a way that the FM signal results in low half-bridge frequencies when the ripple is low and that the FM signal results in high half-bridge frequencies when the ripple is high. As a result, the lamp impedance will behave more constantly. This increases the life of the system.

A particularly preferred lamp for use in the present invention is a metal halide lamp, having a ceramic discharge vessel of which the ionizable gas filling comprises one or more components selected from the group consisting of LiI, NaI, KI, RbI, CsI, $MgI_2$, $CaI_2$, $SrI_2$, $BaI_2$, $ScI_3$, $YI_3$, $LaI_3$, $CeI_3$, $PrI_3$, $NdI_3$, $SmI_2$, $EuI_2$, $GdI_3$, $TbI_3$, $DyI_3$, $HoI_3$, $ErI_3$, $TmI_3$, $YbI_2$, $LuI_3$, InI, TlI, $SnI_2$ and $ZnI_2$, wherein the concentrations h of the respective components in the discharge vessel, expressed in $\mu g/cm^3$, fulfill the equation:

$$\log h = A/Tcs^2 + B/Tcs + C + \log z,$$

wherein Tcs is the minimum coldest spot temperature within the discharge vessel in Kelvin during nominal operation of the lamp, wherein Tcs is at least 1200 K, wherein z is between 0.001 and 2. and wherein A, B and C are defined as follows:

| Component | $A * 10^{-6}$ | $B * 10^{-3}$ | C |
|---|---|---|---|
| LiI | −0.51 | −5.88 | 7.16 |
| NaI | −1.30 | −5.82 | 6.99 |
| KI | −2.51 | −3.48 | 5.66 |
| RbI | −2.04 | −4.95 | 6.48 |
| CsI | −1.40 | −5.72 | 7.13 |
| $MgI_2$ | −1.92 | −4.40 | 8.20 |
| $CaI_2$ | −3.45 | −5.99 | 6.83 |
| $SrI_2$ | −1.99 | −9.33 | 8.05 |
| $BaI_2$ | −2.15 | −10.00 | 8.47 |
| $ScI_3$ | −17.70 | 18.76 | 0.16 |
| $YI_3$ | −7.96 | 0.43 | 6.41 |
| $LaI_3$ | −4.24 | −4.66 | 6.98 |
| $CeI_3$ | −3.15 | −7.37 | 9.36 |
| $PrI_3$ | −1.98 | −7.86 | 8.43 |
| $NdI_3$ | −4.29 | −4.42 | 6.58 |
| $SmI_2$ | −1.62 | −11.20 | 9.71 |
| $EuI_2$ | −1.95 | −10.50 | 8.95 |
| $GdI_3$ | −9.69 | 4.26 | 3.62 |
| $TbI_3$ | −9.41 | 4.09 | 3.59 |
| $DyI_3$ | −11.90 | 6.42 | 4.68 |
| $HoI_3$ | −9.48 | 3.15 | 5.61 |
| $ErI_3$ | −12.10 | 6.54 | 5.46 |
| $TmI_3$ | −3.12 | −5.25 | 7.64 |
| $YbI_2$ | −1.33 | −10.10 | 8.45 |
| $LuI_3$ | −9.00 | 3.37 | 5.38 |
| InI | −1.30 | −2.02 | 6.11 |
| TlI | −1.36 | −2.92 | 7.01 |
| $SnI_2$ | −1.99 | −1.14 | 6.39 |
| $ZnI_2$ | −2.58 | 0.65 | 5.23 |

Nominal operation in this description means operation at the maximum power and under conditions for which the lamp has been designed to be operated.

Such lamp is found to be of high efficacy and showing very stable color properties of the emitted light. In addition, such lamp is dimmable without a substantial shift of the color point (i.e. a reduction of the power below the maximum power preferably results a shift of the color point that stays within 10 SDCM (standard deviation of color matching)). A HID light system according to the invention provided with such a lamp further also has photometric properties that are substantially independent of their spatial orientation and/or ambient temperature.

In a preferred embodiment, z is 1 or smaller, such as between 0.01 and 1. The filling will then be unsaturated at least at nominal operation conditions. The smaller the value of z, the further the operating power of the lamp can be reduced without the filling entering into saturation. This is advantageous for stable color properties over the lamp's operational range of power.

For a more detailed description of this preferred lamp, reference is made to international patent application publication WO-2008/068666, the entire content of which is incorporated here by reference.

Summarizing, the present invention provides a low-cost HID lighting system, comprising an HID lamp having an aspect ratio less than 6; and a resonant electronic driver 10 for driving the HID lamp, the driver being designed for providing alternating current to the lamp and including a control device 30 for determining the current frequency. The lamp has a frequency spectrum containing at least one arc-shaping acoustic resonance frequency as well as unwanted acoustic resonance frequencies. During normal operation, the lamp is provided with frequency-modulated lamp current so that the lamp current has a relatively broad power spectrum within a range between 10 kHz and 200 kHz, so that said arc-shaping acoustic resonance is triggered while said unwanted acoustic resonances are avoided, irrespective of lamp orientation.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, instead of selecting an arc-straightening resonance frequency, it is possible to select an arc-shaping frequency where the arc assumes a fixed shape differing from straight.

Further, immediately after resonant ignition (cold and hot), the lamp impedance will drop significantly. The driver is preferably implemented in a way that the arc straightening measures are performed immediately after ignition of the lamp.

Further, the driver is preferably fitted with a stop and restart function in case the lamp does not ignite. This is desirable since a non-starting lamp will lead to extreme losses that can cause driver failure. This function protects the driver against these losses and engages a re-ignition attempt after a cool down period of the electronics.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. HID lighting system (100), comprising:
    an HID lamp (1) including a closed discharge vessel (2) having a ceramic wall which encloses a discharge space containing an ionizable filling, the lamp further including electrodes (3, 4) of which the tips are located within said discharge space at a mutual distance (EA) defining a discharge path between them, wherein the vessel (2) has a largest internal diameter (di), and wherein the aspect ratio (EA/di) between said mutual distance and said largest internal diameter is less than 6; and
    a resonant electronic driver (10) for driving the HID lamp, the driver being designed for providing alternating current to the lamp and including a control device (30) for determining the current frequency;
    wherein the lamp has a frequency spectrum containing at least one arc-shaping acoustic resonance frequency as well as unwanted acoustic resonance frequencies;
    wherein the driver (10), during normal operation, is designed to provide the lamp (1) with frequency-modulated lamp current so that the lamp current has a relatively broad power spectrum within a range between 10 kHz and 200 kHz, said power spectrum including an enabling power amplitude coinciding with said arc-shaping acoustic resonance frequency while only having non-enabling power amplitudes coinciding with said unwanted acoustic resonance frequencies.

2. HID lighting system according to claim 1, wherein said power spectrum excludes said unwanted acoustic resonance frequencies.

3. HID lighting system according to claim 1, wherein said arc-shaping acoustic resonance frequency is an arc-straightening acoustic resonance frequency, so that the arc has a straight shape irrespective of an orientation of the lamp.

4. HID lighting system according to claim 1, wherein the driver (10) comprises a resonant half-bridge (20).

5. HID lighting system according to claim 1, wherein said modulation includes a frequency sweep, and/or wherein said modulation is performed in accordance with a sine-shaped function.

6. HID lighting system according to claim 1, wherein said driver (10) is powered by rectified mains, and wherein the modulation is implemented in synchronization with the mains ripple in such a way that the current frequency is low when the ripple is low and that the current frequency is high when the ripple is high.

7. HID lighting system according to claim 1, wherein said aspect ratio is less than 3.

8. HID lighting system according to claim 1, wherein said aspect ratio is between 1 and 3.

9. HID lighting system according to claim 1, wherein the lamp is a metal halide lamp, and wherein the discharge space contains an inert gas and a salt, preferably the salt comprises Na halide, Tl halide and one or more halides of Dy, Ho and Tm, more preferably the salt comprises iodides of Na, Tl and at least one of Dy, Ho and Tm.

10. HID lighting system according to claim 9, wherein said inert gas comprises xenon.

11. HID lighting system according to claim 9, wherein said salt allows a tungsten cycle.

12. HID lighting system according to claim 9, wherein said salt is an ionizable salt comprising NaI, TlI, $CaI_2$ and X-iodide, wherein X is one or more elements selected from the group comprising La, Sc, Y and rare earth metals.

13. HID lighting system according to claim 1, wherein the lamp is a metal halide lamp, and wherein the ionizable gas filling comprising one or more components selected from the group consisting of LiI, NaI, KI, RbI, CsI, $MgI_2$, $CaI_2$, $SrI_2$, $BaI_2$, $ScI_3$, $YI_3$, $LaI_3$, $CeI_3$, $PrI_3$, $NdI_3$, $SmI_2$, $EuI_2$, $GdI_3$, $TbI_3$, $DyI_3$, $HoI_3$, $ErI_3$, $TmI_3$, $YbI_2$, $LuI_3$, InI, TlI, $SnI_2$ and $ZnI_2$, wherein the concentrations h of the respective components in the discharge vessel, expressed in μg/cm³, fulfill the equation:

$$\log h = A/Tcs^2 + B/Tcs + C + \log z,$$

wherein Tcs is the minimum coldest spot temperature within the discharge vessel in Kelvin during nominal operation of the lamp, wherein Tcs is at least 1200 K, wherein z is between 0.001 and 2. and wherein A, B and C are defined as follows:

| Component | A * 10⁻⁶ | B * 10⁻³ | C |
|---|---|---|---|
| LiI | −0.51 | −5.88 | 7.16 |
| NaI | −1.30 | −5.82 | 6.99 |
| KI | −2.51 | −3.48 | 5.66 |
| RbI | −2.04 | −4.95 | 6.48 |
| CsI | −1.40 | −5.72 | 7.13 |
| $MgI_2$ | −1.92 | −4.40 | 8.20 |
| $CaI_2$ | −3.45 | −5.99 | 6.83 |
| $SrI_2$ | −1.99 | −9.33 | 8.05 |
| $BaI_2$ | −2.15 | −10.00 | 8.47 |
| $ScI_3$ | −17.70 | 18.76 | 0.16 |
| $YI_3$ | −7.96 | 0.43 | 6.41 |
| $LaI_3$ | −4.24 | −4.66 | 6.98 |
| $CeI_3$ | −3.15 | −7.37 | 9.36 |
| $PrI_3$ | −1.98 | −7.86 | 8.43 |
| $NdI_3$ | −4.29 | −4.42 | 6.58 |
| $SmI_2$ | −1.62 | −11.20 | 9.71 |
| $EuI_2$ | −1.95 | −10.50 | 8.95 |
| $GdI_3$ | −9.69 | 4.26 | 3.62 |
| $TbI_3$ | −9.41 | 4.09 | 3.59 |
| $DyI_3$ | −11.90 | 6.42 | 4.68 |
| $HoI_3$ | −9.48 | 3.15 | 5.61 |
| $ErI_3$ | −12.10 | 6.54 | 5.46 |
| $TmI_3$ | −3.12 | −5.25 | 7.64 |
| $YbI_2$ | −1.33 | −10.10 | 8.45 |
| $LuI_3$ | −9.00 | 3.37 | 5.38 |
| InI | −1.30 | −2.02 | 6.11 |
| TlI | −1.36 | −2.92 | 7.01 |
| $SnI_2$ | −1.99 | −1.14 | 6.39 |
| $ZnI_2$ | −2.58 | 0.65 | 5.23. |

14. Method for generating light, the method comprising the steps of:
    providing an HID lamp (1) including a closed discharge vessel (2) having a ceramic wall which encloses a discharge space containing an ionizable filling, the lamp further including electrodes (3, 4) of which the tips are located within said discharge space at a mutual distance (EA) defining a discharge path between them, wherein the vessel (2) has a largest internal diameter (di), and wherein the aspect ratio (EA/di) between said mutual distance and said largest internal diameter is less than 6; and wherein the lamp has a frequency spectrum containing at least one arc-shaping acoustic resonance frequency as well as unwanted acoustic resonance frequencies;

wherein the method comprises the steps of:

providing alternating current to the lamp wherein the current frequency is set within a range between 10 kHz and 200 kHz;

performing a frequency modulation of the power inputted into the lamp, lowering and broadening the power spectrum, such that the resulting power spectrum includes an enabling power amplitude coinciding with said arc-shaping acoustic resonance frequency such as to realize arc-shaping, preferably arc-straightening, while the resulting power spectrum only has non-enabling power amplitudes coinciding with said unwanted acoustic resonance frequencies such as to avoid triggering unwanted acoustic resonances.

* * * * *